(12) United States Patent
Chimfwembe et al.

(10) Patent No.: US 7,031,050 B2
(45) Date of Patent: Apr. 18, 2006

(54) METHOD AND SYSTEM FOR PRECISION CROSS-TALK CANCELLATION IN OPTICAL AMPLIFIERS

(75) Inventors: Patrick Chilufya Chimfwembe, Ottawa (CA); Dung Van Nguyen, Ottawa (CA); Benjamin Wai Chan, Kanata (CA)

(73) Assignee: Tropic Networks Inc., Kanata (CA)

( * ) Notice: Subject to any disclaimer, the term of this patent is extended or adjusted under 35 U.S.C. 154(b) by 355 days.

(21) Appl. No.: 10/607,968

(22) Filed: Jun. 30, 2003

(65) Prior Publication Data

US 2004/0032643 A1   Feb. 19, 2004

Related U.S. Application Data

(60) Provisional application No. 60/402,924, filed on Aug. 14, 2002.

(51) Int. Cl.
   *H01S 3/00* (2006.01)
(52) U.S. Cl. ..................................... 359/337
(58) Field of Classification Search ............ 359/337.22
   See application file for complete search history.

(56) References Cited

U.S. PATENT DOCUMENTS

| | | | | |
|---|---|---|---|---|
| 5,706,125 A | * | 1/1998 | Nakano | 359/337.22 |
| 5,745,274 A | | 4/1998 | Fatehi et al. | 398/198 |
| 5,801,863 A | | 9/1998 | Fatehi et al. | 398/79 |
| 5,847,856 A | | 12/1998 | Imai et al. | 398/195 |
| 5,892,606 A | | 4/1999 | Fatehi et al. | 398/181 |
| 5,970,185 A | * | 10/1999 | Baker et al. | 385/3 |
| 6,246,514 B1 | | 6/2001 | Bonnedal et al. | 359/341.41 |
| 6,606,178 B1 | * | 8/2003 | Rhee et al. | 398/188 |
| 6,626,591 B1 | * | 9/2003 | Bellotti et al. | 398/79 |
| 2002/0044322 A1 | * | 4/2002 | Blumenthal et al. | 359/161 |
| 2002/0044343 A1 | * | 4/2002 | Manzur | 359/337.11 |

FOREIGN PATENT DOCUMENTS

| | | |
|---|---|---|
| EP | 0 637 148 A1 | 2/1995 |
| WO | WO - 02 080378 A | 10/2002 |

OTHER PUBLICATIONS

Srivastava, A.K., et al, "Fast-Link Control Protection of Surviving Channels in Multiwavelength Optical Networks", IEEE Photon. Technol. Lett., vol. 9, pp. 1667-1669, Dec. 1997.

(Continued)

*Primary Examiner*—Deandra M. Hughes
(74) *Attorney, Agent, or Firm*—Victoria Donnelly

(57) ABSTRACT

The invention provides improved methods and systems for a precise and selective cross-talk cancellation and pilot tones deletion in optical amplifiers. The method for cancellation of cross-talk among multiple channels occurring in a traditional optical amplifier comprises: detecting tones at an input and an output of a Smart Optical Amplifier that includes a traditional optical amplifier and a Cross-talk Cancellation Unit; comparing the detected tones at the input and output of the Smart Optical Amplifier; generating destructive tones with such amplitudes and phases so as to cancel cross-talk; and eradicating cross-talk at the output of the Smart Optical Amplifier by applying the destructive tones in the Cross-talk Cancellation Unit. Eight different embodiments that correspond to different combinations of traditional optical amplifier types and the type of technology (analog or digital) used in processing and control of signals are described.

48 Claims, 15 Drawing Sheets

OTHER PUBLICATIONS

Chung, H.S., et al, "Effects of Stimulated Raman Scattering on Pilot-Tone-Based WDM Supervisory Technique", IEEE Photon. Technol. Lett., vol. 12, pp. 731-733, Jun. 2000.

Kim, H.K., et al, "Reduction of Cross-Gain Modulation in the Semiconductor Optical Amplifier by Using Wavelength Modulated Signal", IEEE Photon. Technol. Lett., vol. 10, pp. 1412-1414, Oct. 2000.

Freeman, J., et al, "Gain Modulation Response of Erbium-Doped Fiber Amplifiers", IEEE Photon. Technol. Lett., vol. 5, pp. 224-226, Feb. 1993.

Novak, S., et al, "Analytic Model for Gain Modulation in EDFAs", Journal of Lightwave Technol. vol. 20, No. 6, pp. 975-985, Jun. 2002.

* cited by examiner

METHOD AND SYSTEM FOR PRECISION CROSS-TALK CANCELLATION IN OPTICAL AMPLIFIERS

RELATED APPLICATION

This application claims priority from U.S. Provisional Patent Application Ser. No. 60/402,924 to CHIMFWEMBE, et al, entitled "Method and System for Precision Cross Talk Cancellation in Optical Amplifiers", filed on Aug. 14, 2002.

FIELD OF INVENTION

This invention relates to methods and systems for cancellation of cross-talk among multiple channels in optical amplifiers.

BACKGROUND OF INVENTION

Optical monitoring in Dense Wavelength Division Multiplexing (DWDM) systems is deployed for detecting the presence or absence of wavelength channels and measuring the optical powers of the channels, using pilot tones as an economic means. Metro and long haul networks utilize Optical Amplifiers (OA) to increase the distance between nodes. Unfortunately the OAs, such as the Erbium Doped Fiber Amplifier (EDFA) and the Semiconductor Optical Amplifier (SOA), introduce cross-talk in the process of amplifying a specific optical channel, such that attenuated copies of tones (cross-talk) from other channels on the DWDM fiber are superimposed on the specific optical channel. The cross-talk tones indicate the presence of non-existent channels and introduce inaccuracies in power measurement. Undesirable spurious tones on any optical channel may cause poor Signal to Noise Ratio (SNR) on the specific channel and other optical channels via cross-talk in an OA, which makes accurate optical monitoring very difficult.

The problem of cross-talk among multiple channels that are amplified by a given OA is explained with the help of FIG. 1. Consider two channels corresponding to wavelengths $\lambda_1$ and $\lambda_2$ that are incident on the input of the OA 100. The amplitudes of the signals at time t1 are 6 units (u) and 6 u respectively. The gain of 1.5 produced by the amplifier results in an output of 9 u for each of the channels at time t1+$\Delta$t. Consider a time instant t2 at which the amplitude of $\lambda_1$ has changed to 3 u, while the amplitude of $\lambda_2$ is still 6 u. The expected output for $\lambda_1$ is 4.5 u and the output for $\lambda_2$ should remain unchanged at 9 u. However, due to Cross Gain Modulation (XGM), the gain of the amplifier is changed to 2 and the outputs at time t2+$\Delta$t for $\lambda_1$ and $\lambda_2$ become 6 u and 12 u respectively. Note that these outputs are achieved because the OA 100 attempts to maintain the same output power level (corresponding to 18 u) at instants t1+$\Delta$t and t2+$\Delta$t. Clearly, the additional 3 u appearing at $\lambda_2$ is spurious and corresponds to cross-talk induced by the channel with the wavelength of $\lambda_1$.

The "Link Method" described in articles by Srivastava, A. K. et al., "Fast-Link Control Protection of Surviving Channels in Multiwavelength Optical Networks", IEEE Photonics Technology Letters, Vol. 9, pp. 1667–1669, December 1997 and by Chung H. S. et al., "Effects of Stimulated Raman Scattering on Pilot-Tone-Based WDM Supervisory Technique", IEEE Photonics Technology Letters, Vol. 12, pp. 731–733, June 2000, has been used for cross-talk cancellation, which involves maintaining the input power of the EDFA constant by using an external modulated Continuous Wave (CW) source, that adds to system cost.

Another technique has been described by Kim H. K. and Chandrasekhar S., "Reduction of Cross-Gain Modulation in the Semiconductor Optical Amplifier by Using Wavelength Modulated Signal", IEEE Photonics Technology Letters, Vol. 10, pp.1412–1414, October 2000, in which external multiple modulated CW sources have been used for cross-talk cancellation in SOAs, by maintaining the input power to the SOA constant. This technique requires an external CW laser source for each DWDM channel supported, thus increasing the system cost for each additional DWDM channel.

A drawback of these methods is that they require additional hardware that increases the cost of the system.

In technical papers by Freeman J., and Conradi, J., "Gain Modulation Response of Erbium-Doped Fiber Amplifiers'" IEEE Photonics Technology Letters, Vol.5, pp. 224–226, February 1993, and by Novak S. and Moesle, A., "Analytic Model for Gain Modulation in EDFAs", Journal of Lightwave Technology, Vol.20, No.6, pp.975–985, June 2002, encoding low frequency tones on an optical channel via EDFA pump modulation has been described. These methods use encoding of a tone on a channel via EDFA pump modulation, but do not provide a reference to using the encoding tone to cancel cross-talk in optical amplifiers.

Encoding and decoding low frequency tones on an optical channel via intensity modulators has been described by Mohammad Fatehi et al. in U.S. Pat. Nos. 5,892,606, 5,801,863, and No. 5,745,274. These methods provide encoding of tones on a channel and removal of tones from the channel, but do not address the problem of channel cross-talk in optical amplifiers.

Accordingly, there is a need in the industry for the development of an improved method and system for cross-talk cancellation in optical amplifiers, which would be simple, inexpensive and provide precise and selective cancellation of cross-talk tones in various types of amplifiers.

SUMMARY OF INVENTION

Therefore there is a need for an improved method and system for cross-talk cancellation that would overcome or reduce the problems of the prior art systems.

It is an objective of the present invention to provide improved methods and systems for cancellation of cross-talk among multiple channels in OAs, which would provide a precise and selective cross-talk cancellation and pilot tones deletion in optical amplifiers.

A method for cancellation of cross-talk among multiple channels occurring in a traditional Optical Amplifier (OA), the method comprising steps of: detecting tones at an input and an output of a Smart Optical Amplifier (Smart OA), the Smart OA comprising of the traditional OA and a Cross-talk Cancellation Unit (XTCU); comparing the detected tones at the input and output of the Smart OA; generating destructive tones with such amplitudes and phases so as to cancel cross-talk; and eradicating cross-talk at the output of the Smart OA by applying the destructive tones in the XTCU. The step of detecting tones at the input and the output of the Smart OA comprises the steps of tapping input and output optical signals at the input and the output of the Smart OA; converting tapped optical signals into electrical signals; and detecting a pilot tone at the input and output of the Smart OA. The steps of comparing the detected tones and generating the destructive tones comprise the steps of processing the electrical signals corresponding to the input and output of the Smart OA in a Processing and Control Unit (PCU) and a gain information signal from the Smart OA for the PCU;

and generating cross-talk cancellation tones by the PCU. The step of processing the electrical signals in the PCU comprises the step of processing the electrical signals in an analog PCU including an amplitude and phase adjustment unit and an analog comparator unit. The step of processing the electrical signals in the analog PCU further comprises the steps of performing adjustments of the output signal of the Smart OA using a gain information signal provided by the traditional OA when gain of the traditional OA is changed; and comparing frequency domain spectra of the input and the processed output signals of the Smart OA by the analog comparator unit and generating the cross-talk cancellation tones. The step of comparing the frequency domain spectra and generating the cross-talk cancellation tones further comprises steps of identifying the cross-talk tones and determining if the cross-talk tones are greater than a predetermined noise floor threshold; and generating a sum of all the cancellation tones with such amplitudes and phases as an output of the PCU so as to eradicate cross-talk when the cross-talk tones are greater than said noise floor threshold. The step of detecting tones comprises detecting tones at the input and the output of the Smart OA that includes an Erbium Doped Fiber Amplifier (EDFA) and the XTCU. The step of eradicating cross-talk at the output of the Smart OA comprises modulating a pump laser in the EDFA by using the output of the analog PCU. The step of modulating the pump laser in the EDFA further comprises the steps of inserting a pump signal into an Erbium Doped Fiber Coil (EDFC) within the EDFA through a pump add filter of the EDFA; and removing a remaining pump signal at the output of the EDFC by a pump drop filter of the EDFA. The step of processing the electrical signals comprises the step of detecting tones at the input and the output of the Smart OA that includes a Semiconductor Optical Amplifier (SOA) and the XTCU. The step of eradicating cross-talk at the output of the Smart OA comprises a step of modulating an electrical pump in the SOA by using the output of the analog PCU. The step of processing the electrical signals in the analog PCU comprises the step of detecting tones at the input and the output of the Smart OA that includes the EDFA and an electrically controlled Variable Optical Attenuator (eVOA)-based XTCU. The step of eradicating cross-talk at the output of the Smart OA comprises the step of controlling attenuation of the eVOA by using the output of the analog PCU. The step of processing the electrical signals comprises the step of detecting tones at the input and the output of the Smart OA that includes the SOA and the eVOA-based XTCU. The step of eradicating cross-talk at the output of the Smart OA comprises the step of controlling attenuation of the eVOA using the output of the analog PCU. The step of processing the electrical signals in the PCU comprises the step of processing electrical signals in a digital PCU, comprising A/D converters, tone detectors, an amplitude and phase adjustment unit, and a digital comparator unit. The step of processing of the electrical signals in the digital PCU further comprises steps of converting said signals from analog to digital by the A/D converters; converting the digital signals, which are in time domain into frequency domain spectra by the tone detectors; performing adjustments of the converted Smart OA output signal, using a gain information signal provided by the traditional OA when the traditional OA gain is changed; and comparing the frequency domain spectra of the input and the processed output signals of the Smart OA by the digital comparator unit and generating cross-talk cancellation tones. The step of comparing the frequency domain spectra and generating the cross-talk cancellation tones further comprises the steps of identifying the cross-talk tones and determining if the cross-talk tones are greater than a predetermined noise floor threshold; and generating the cross-talk cancellation tones with such amplitudes and phases as an output of the digital PCU so as to eradicate the cross-talk, when the cross-talk tones are greater than said noise floor threshold. The step of processing the electrical signals comprises the step of detecting the tones at the input and the output of the Smart OA that includes the EDFA and the XTCU. The step of detecting the tones comprises the step of converting the output of the digital PCU from digital to analog by using a D/A converter in the XTCU, and modulating the pump laser in the EDFA by using the output from the D/A converter. The step of modulating the pump laser in the EDFA further comprises steps of inserting a pump signal into the EDFC within the EDFA through a pump add filter of the EDFA; and removing the remaining pump signal at the output of the EDFC by a pump drop filter of the EDFA. The step of processing the electrical signals comprises the step of detecting the tones at the output of the Smart OA that includes the SOA and the XTCU. The step of detecting the tones comprises converting the output of the digital PCU from digital to analog by using the D/A converter and modulating an electrical pump in the SOA by using the output of the D/A converter. The step of processing the electrical signals comprises the step of detecting tones at the input and the output of the Smart OA, that includes the EDFA and the eVOA-based XTCU. The step of detecting tones comprises the step of converting output of the digital PCU from digital to analog by using the D/A converter and controlling the attenuation of the eVOA by using the output of the D/A converter. The step of processing the electrical signals comprises the step of detecting tones at the input and the output of the Smart OA including the SOA and the eVOA-based XTCU. The step of detecting tones comprising the step of converting the output of the digital PCU from digital to analog by using the D/A converter and controlling the attenuation of the eVOA by using the output of the D/A converter.

A system for cancellation of cross-talk among multiple channels occurring in a traditional Optical Amplifier (OA), the system comprising: a Smart Optical Amplifier (Smart OA) having an input and an output and comprising the traditional OA and a Cross-Talk Cancellation Unit (XTCU); means for detecting tones at the input and the output of the Smart OA; means for comparing the detected tones at the input and the output of the Smart OA and generating destructive tones with such amplitudes and phases so as to cancel the cross-talk; and means for eradicating the cross-talk at the output of the Smart OA by applying the destructive tones in the XTCU. The means for detecting tones at the input and the output of the Smart OA comprises optical taps for tapping optical signals at the input and the output of the Smart OA; optical to electrical converters for converting the tapped optical signals into electrical signals; and means for detecting a pilot tone at the input and the output of the Smart OA. The means for comparing the detected tones and generating destructive tones further comprises a Process Control Unit (PCU) comprising means for processing the electrical signals and a gain information signal from the Smart OA; and means for generating cross-talk cancellation tones, wherein the PCU is an analog PCU. The analog PCU further comprises an amplitude and phase adjustment unit for performing adjustments of an output signal from the Smart OA using a gain information signal provided by the traditional OA when the gain of the traditional OA is changed; and an analog comparator unit for comparing frequency domain spectra of the input and the processed output signals of the Smart OA and generating the cross-talk cancellation tones. The analog comparator unit comprises means for identifying the cross-talk tones and determining if the cross-talk tones are greater than a predetermined noise floor threshold; and a tone generator for generating a sum of all the cancellation tones with such amplitude and phases as the output of the PCU so as to eradicate cross-talk, when the cross-talk tones are greater than said noise floor threshold. The Smart OA includes an EDFA and the XTCU, wherein the EDFA includes a pump laser which is modulated by using the output of the analog PCU. The means for modulating further comprises a pump add filter for inserting a pump signal into an Erbium Doped Fiber Coil (EDFC) within the EDFA; and a pump drop filter for removing a remaining pump signal at an output of the EDFC. The Smart OA includes an SOA and the XTCU, wherein the SOA includes an electrical pump which is modulated by using the output of the analog PCU. The Smart OA includes the EDFA and an electrically controlled Variable Optical Attenuator (eVOA)-based XTCU. The Smart OA comprises the SOA and the eVOA-based XTCU. The PCU is a digital PCU. The digital PCU further comprising: A/D converters for converting said signals from analog to digital; tone detectors for converting the digital signals which are in time domain into frequency domain spectra; an amplitude and phase adjustment unit for performing adjustments of an output signal from the Smart OA, using the gain information signal provided by the traditional OA when the traditional OA gain is changed; and a digital comparator unit for comparing the frequency domain spectra of the input and the processed output signals of the Smart OA and generating the cross-talk cancellation tones. The digital comparator unit comprises means for identifying the cross-talk tones and determining if the cross-talk tones are greater than a predetermined noise floor threshold; and means for generating the cancellation tones as the output of the digital PCU with such amplitude and phases so as to eradicate cross-talk, when the cross-talk tones are greater than the said noise floor threshold. The Smart OA includes the EDFA and the XTCU, wherein the EDFA includes a pump laser which is modulated by using the output of a D/A converter used for converting the output of the digital PCU from digital to analog signal. The means for modulating the pump laser in the EDFA further comprises: a pump add filter for inserting a pump signal into the EDFC within the EDFA; and a pump drop filter for removing the remaining signal at the output of the EDFC. The Smart OA comprises the SOA and the XTCU, the SOA includes an electrical pump which is modulated by using the output of the D/A converter used for converting the output of the digital PCU from digital to analog signal. In the system the Smart OA comprises the EDFA and the eVOA-based XTCU. In the system the Smart OA comprises the SOA and the eVOA-based XTCU.

These described methods and systems do not require external CW lasers as the inherent pump of the EDFA or SOA or an eVOA has been utilized, leading to inexpensive implementations of the cross-talk cancellation techniques.

BRIEF DESCRIPTION OF THE DRAWINGS

Further features and advantages of the invention will be apparent from the following description of the embodiments, which are described by way of example only and with reference to the accompanying drawings, in which.

DETAILED DESCRIPTION OF PREFERRED EMBODIMENTS

Figure 1:
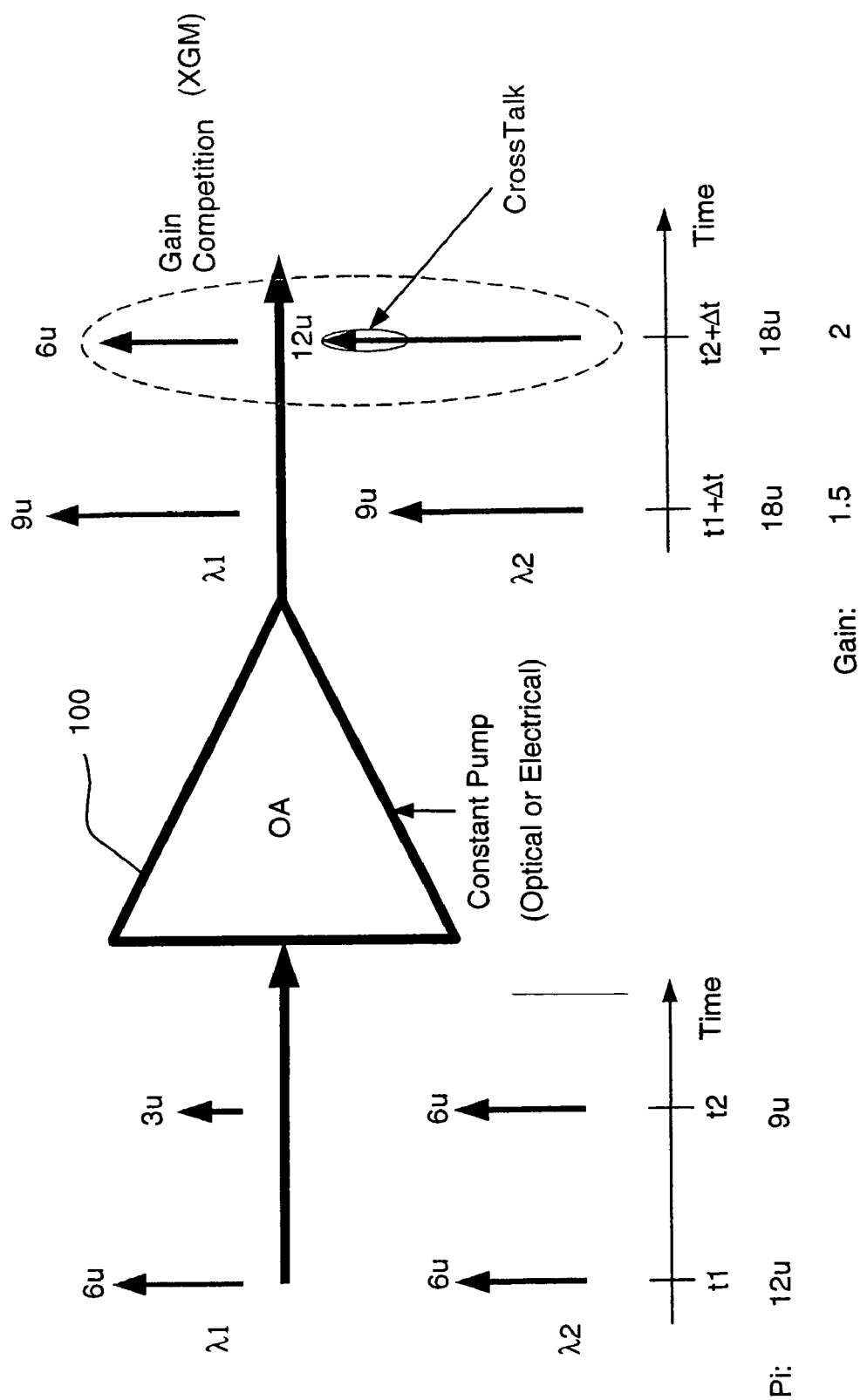
FIG. 1 illustrates the cross-talk problem in an optical amplifier.
Figure 2:
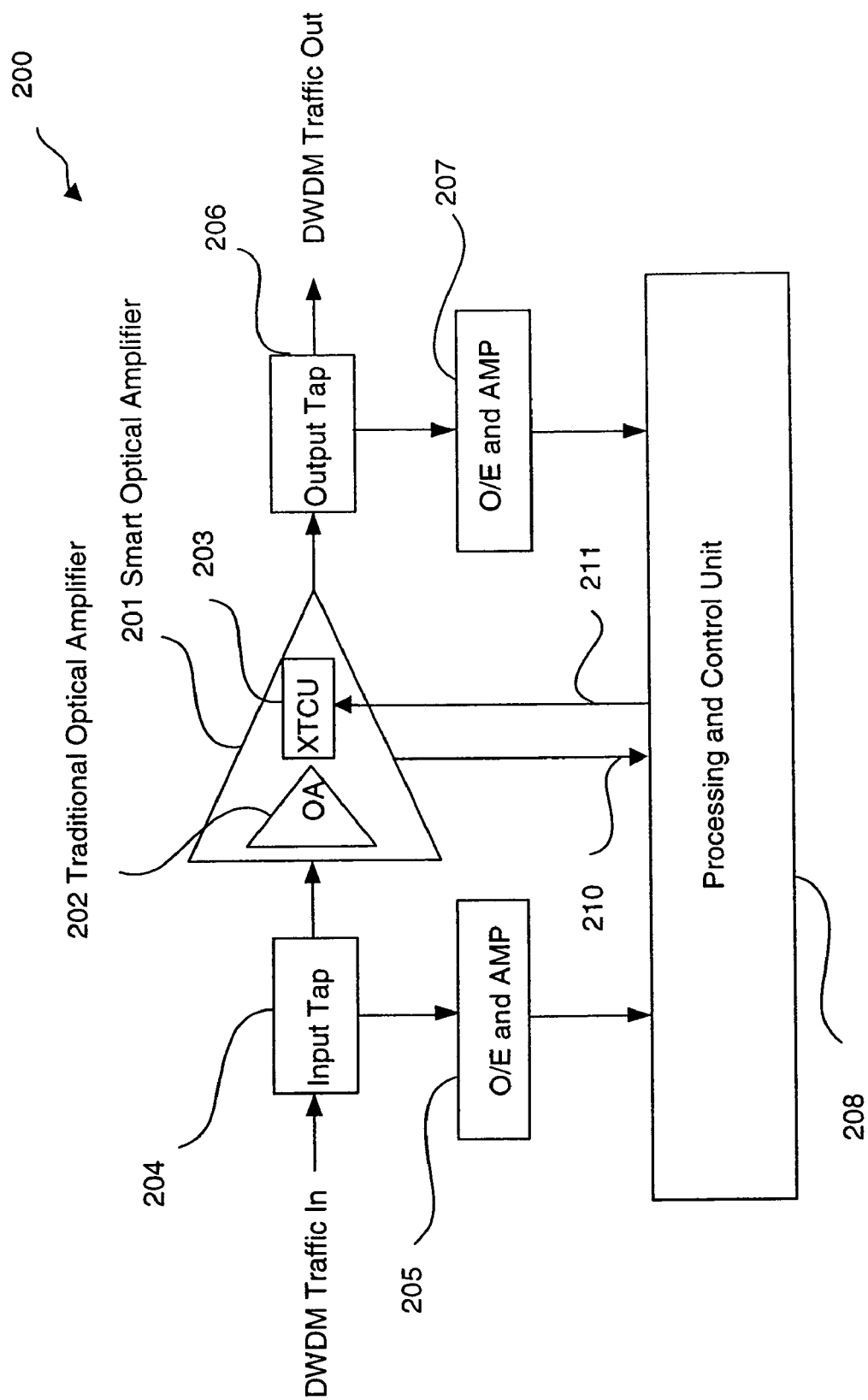
FIG. 2 shows a system for cross-talk cancellation in optical amplifiers according to the embodiments of the invention.
Figure 3:
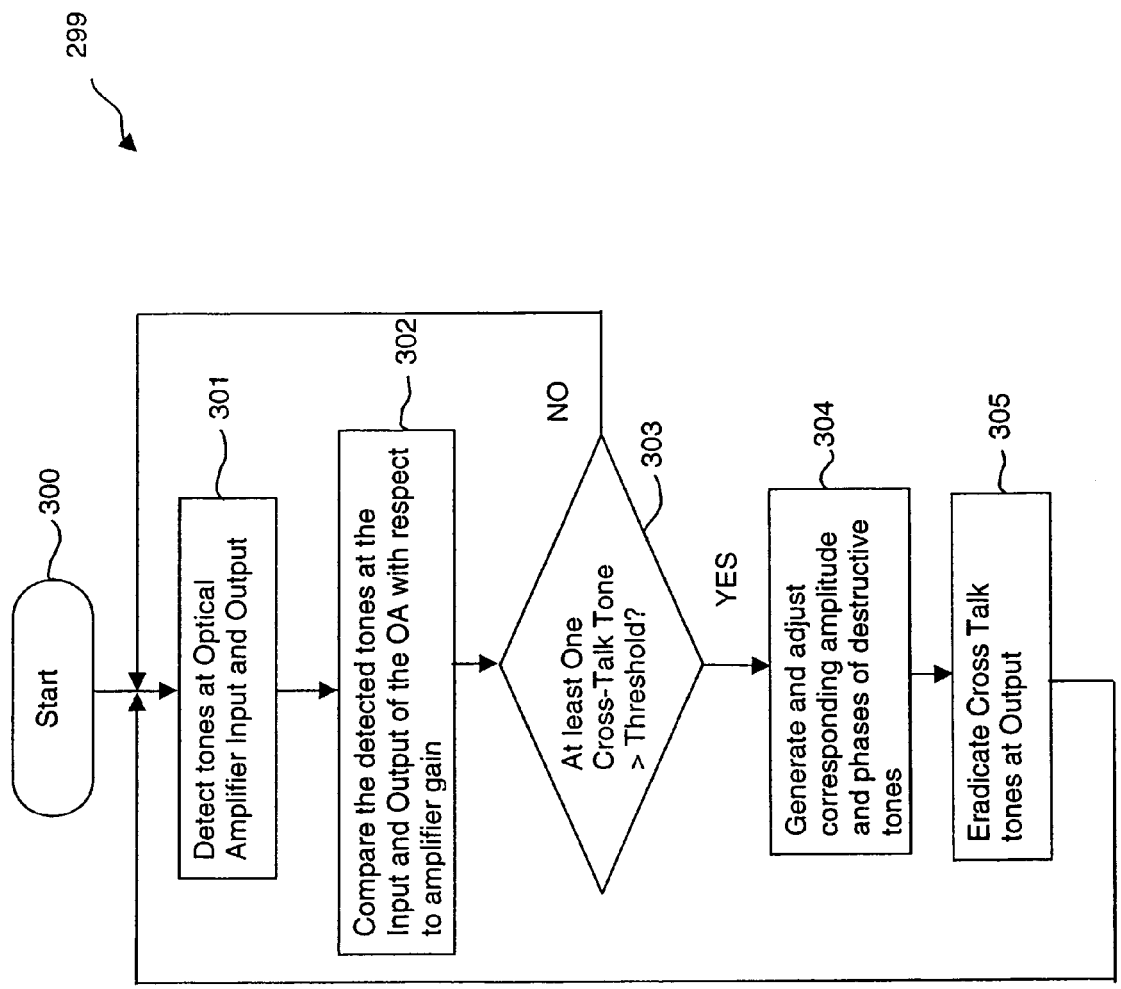
FIG. 3 shows a flowchart, illustrating a method of cross-talk cancellation in optical amplifiers implemented in the system of FIG. 2.

The basic principles and techniques that are common to all embodiments are explained with the help of FIGS. 2 and 3. FIG. 2 presents a system for cross-talk cancellation in optical amplifiers whereas FIG. 3 presents a flowchart illustrating a method of operation of the system of FIG. 3. The system 200 comprises a Smart OA 201 that consists of a traditional OA 202 and a cross-talk cancellation unit (XTCU) 203, components 204 and 206 that are used to tap the input and outputs of the Smart OA 201 respectively, and components 205 and 207 for converting the sample optical signals into electrical signals and amplifying the signals that are processed by the Processing and Control Unit (PCU) 208, in accordance with the gain information signal 210 arriving from the Smart OA 201. The output of the PCU 208 is used to control the Smart OA 201. The XTCU 203 in the Smart OA 201 uses the cross-talk cancellation tones 211 generated by the PCU 208 to remove cross-talk, such that the DWDM output traffic for any given λ is an exact amplified version of the corresponding input DWDM input traffic.

FIG. 3 shows a flowchart 299 illustrating the steps of the method for cross-talk cancellation implemented in the system 200 of FIG. 2. Upon start (box 300) the tones are detected by components 204 and 206 in FIG. 2, at both the input and output of the Smart OA 201 (box 301). The tapped input tones are then compared with the tapped output tones by the PCU 208 (box 302) with respect to amplifier gain. The output of this comparison is the difference between the input and the compensated output spectra and corresponds to the cross-talk. If at least one of the cross-talk tones is higher than a previously specified threshold, then cancellation is required and the procedure exits ("Yes" from box 303); otherwise, cancellation is not required and the procedure exits ("No" from box 303). If at least one of the cross-talk tones is higher than the threshold, a destructive tone (with appropriate amplitude and phase) for canceling cross-talk is generated by the PCU 208 (box 304). This cross-talk cancellation tone is then fed back to the XTCU 203 in the Smart OA 201, and the cross-talk tones at the output of the Smart OA 201 (box 305) are eradicated.

Eight different techniques (embodiments) for cross-talk cancellation that rely on the method discussed in the previous paragraph are described in this application. The difference among these techniques depends on whether an EDFA, an SOA, or an eVOA is used inside the Smart OA 201, as well as, whether a digital or analog technology is used in the PCU 208.

Figure 4:
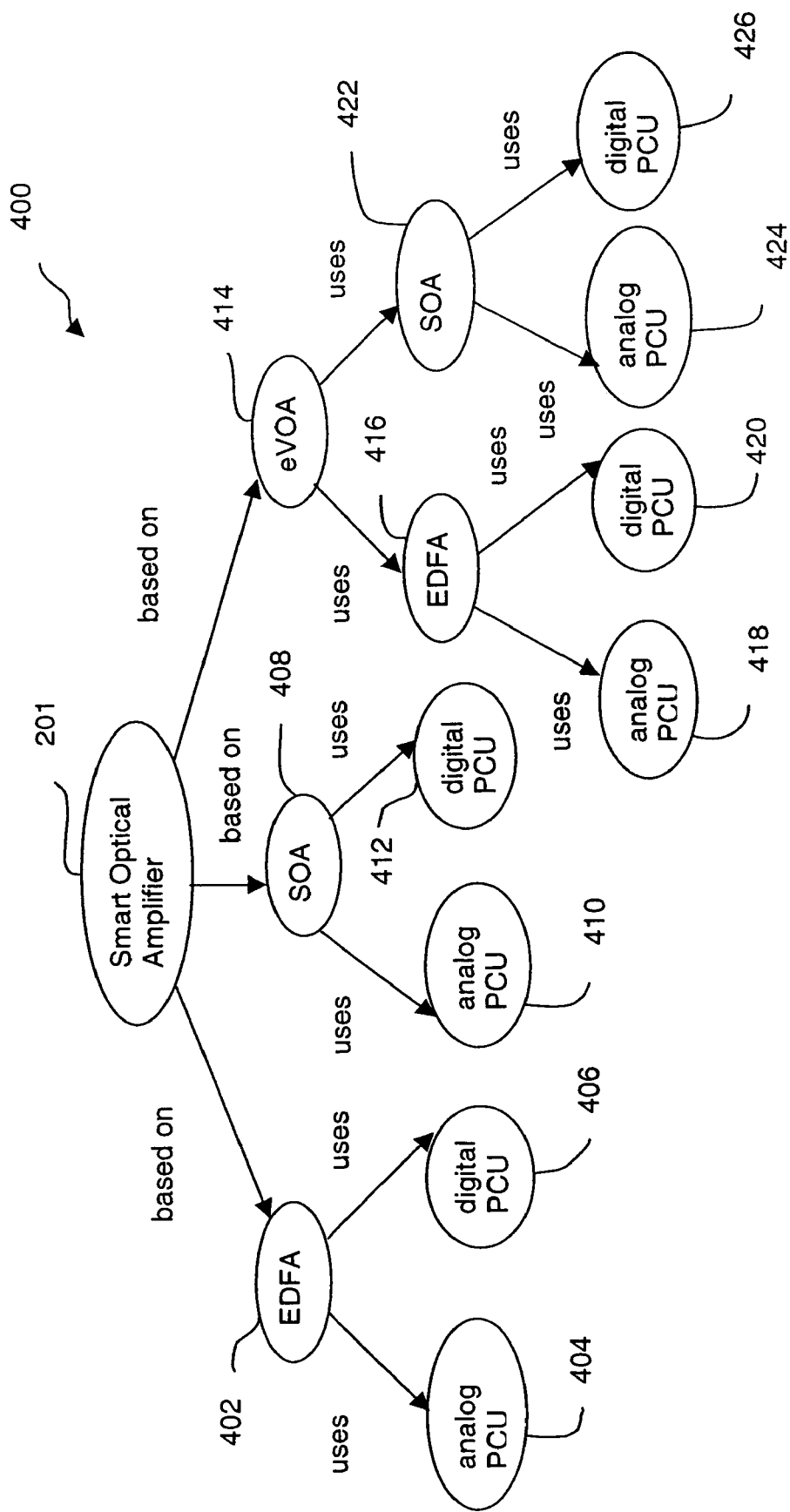
FIG. 4 illustrates a system hierarchy for the eight different embodiments of the invention.

The eight different embodiments correspond to eight different paths from the root to the leaf nodes of the system hierarchy 400 and are presented in FIG. 4. The first four embodiments use pump modulation whereas the last four utilize an eVOA-based technique. The first two embodiments correspond to an EDFA-based system (box 402) with an analog PCU used in the first embodiment (box 404) and a digital PCU (box 406) used in the second embodiment. The third and the fourth embodiments correspond to an SOA-based system (box 408) with an analog PCU used in the third embodiment (box 410) and a digital PCU used in the fourth embodiment (box 412). The fifth and sixth embodiments deploy an eVOA-based technique (box 414) used in conjunction with an EDFA (box 416). An analog PCU is used in the fifth embodiment (box 418) and a digital PCU in the sixth embodiment (box 420). The seventh and the eighth embodiments correspond to an eVOA-based technique (box 414) used in conjunction with an SOA (box 422). An analog PCU (box 424) is used in the seventh embodiment and a digital PCU (box 426) in the eighth embodiment. Each of these eight embodiments is explained with the help of FIG. 5 to FIG. 8 and FIG. 12 to FIG. 15 respectively.

The first four embodiments use pump modulation for cross-talk eradication that is explained with help of FIG. 5 to FIG. 8. The first embodiment (see FIG. 5) uses the optical amplifier 201 implemented as a Smart EDFA 500 and the processing and control unit 208 implemented as an analog PCU 518. The system 499 comprises Input Optical Tap 505 and Output Optical Tap 506 for detecting the pilot tones carried in the DWDM signals at the input and output of the Smart OA. In this embodiment, the Smart OA is a Smart EDFA 500. The smart EDFA comprises an XTCU 512, a traditional EDFA 511, an EDFA Pump Laser 504 and a Driver 520. The Traditional EDFA 511 comprises a Pump Add Filter 502, a Pump Drop Filter 503, an EDFA main Control 521 and an EDFC 501. The tapped input Optical signal is converted to electrical signal by using an O/E Amplifier 526 which comprises a PIN diode 507 and an Amplifier 509. The tapped output signal is converted to electrical signal by using an O/E Amplifier 527 which comprises a PIN diode 508 and an Amplifier 510. The converted output signal is processed by a PCU 208 implemented as an analog PCU 518. The analog PCU 518 comprises an Amplitude & Phase Adjustment Unit 515, and a Comparator 516.

Figure 5:
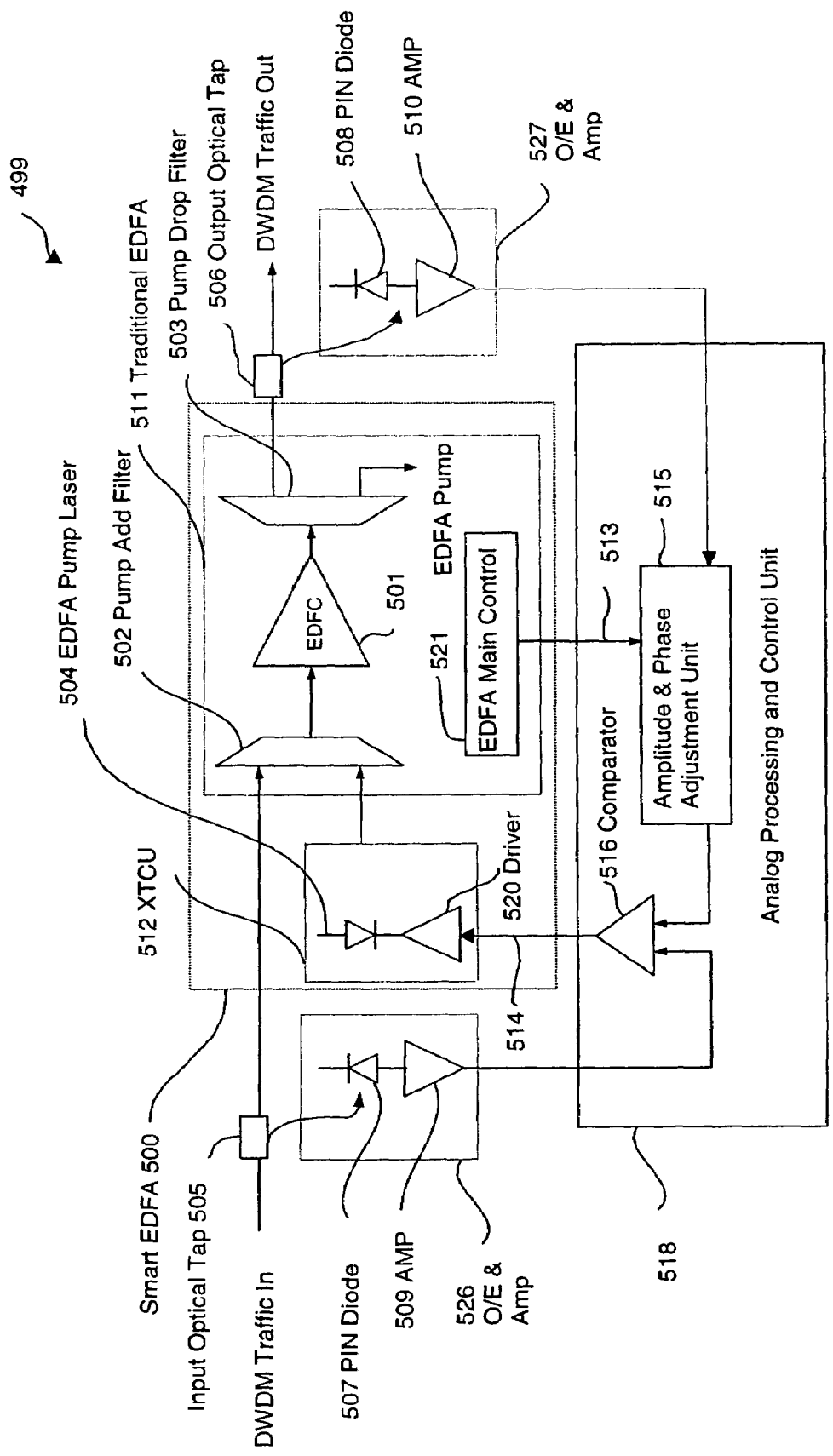
FIG. 5 shows the system for cross-talk cancellation according to the first embodiment that uses an EDFA and an analog PCU.
Figure 6:
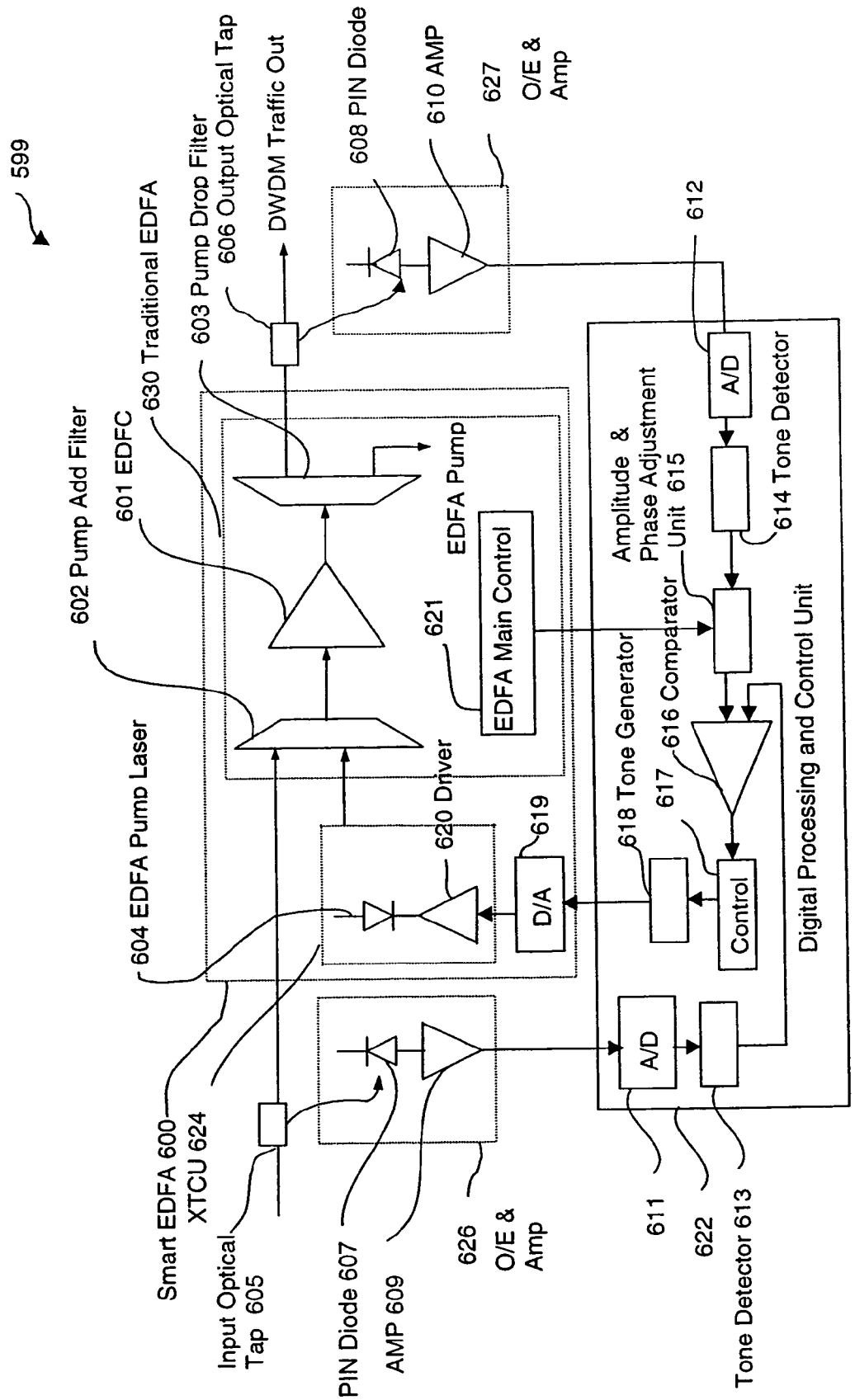
FIG. 6 shows the system for cross-talk cancellation according to the second embodiment that uses an EDFA and a digital PCU.
Figure 7:
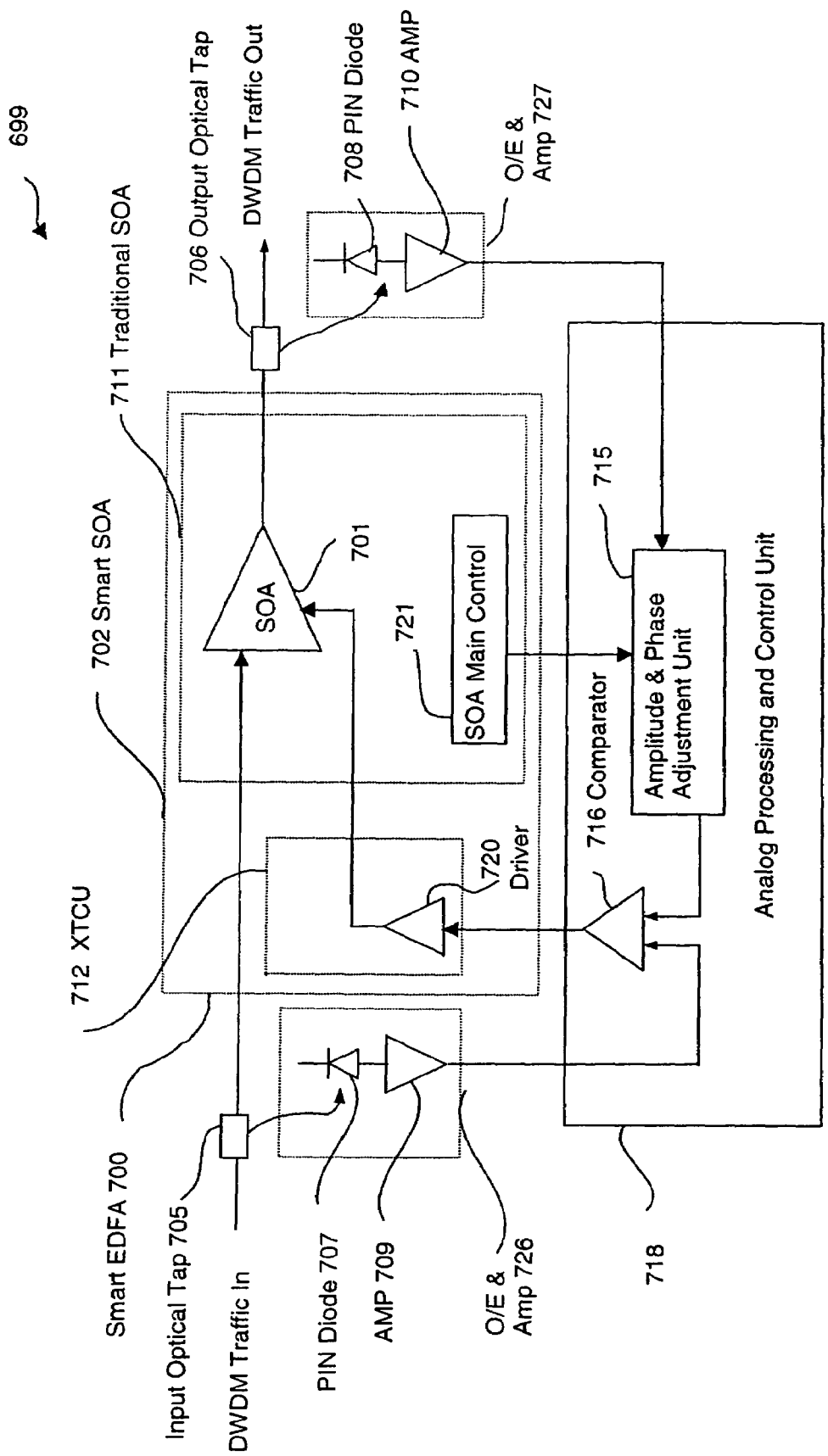
FIG. 7 shows the system for cross-talk cancellation according to the third embodiment that uses an SOA and an analog PCU.
Figure 8:
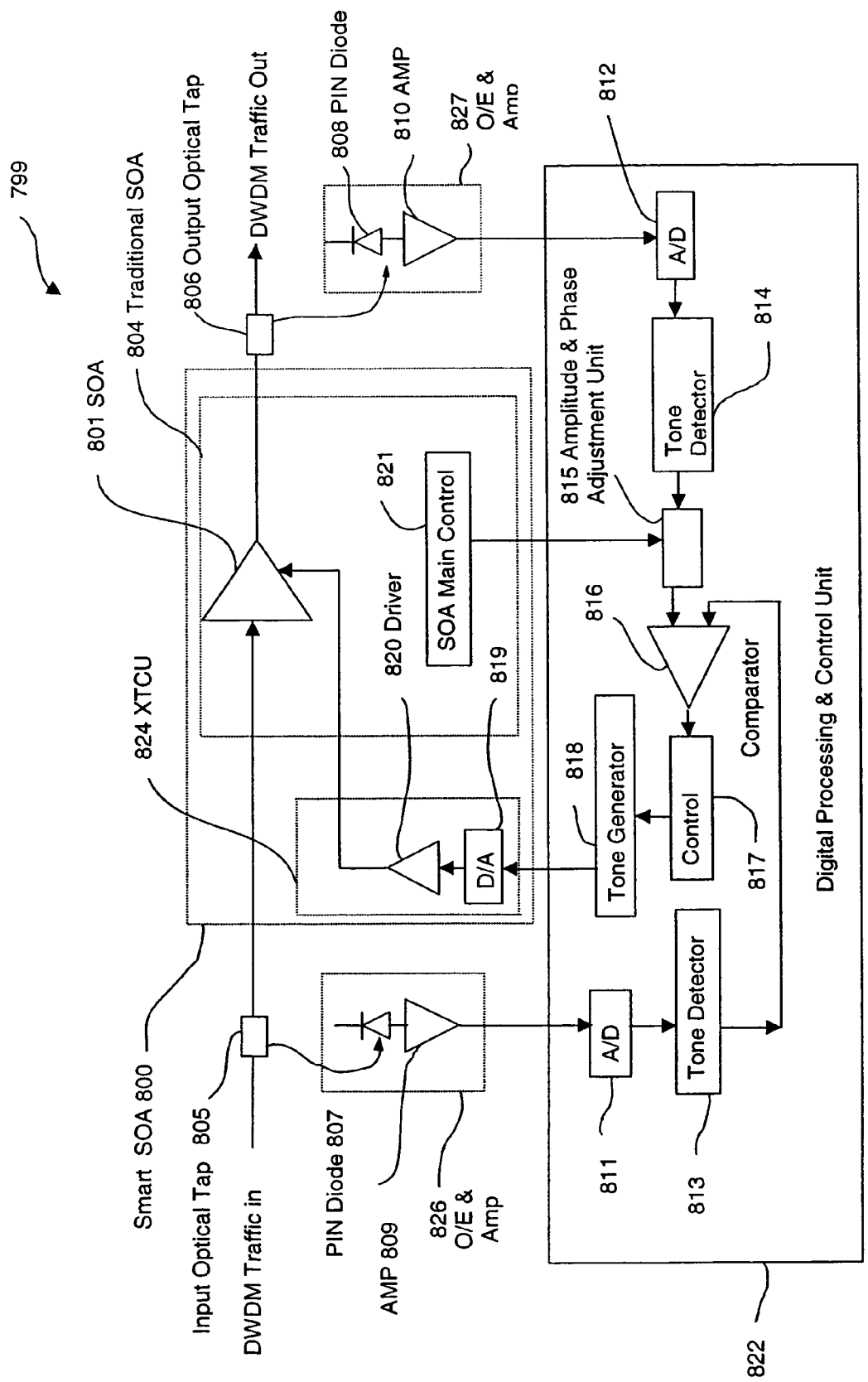
FIG. 8 shows the system for cross-talk cancellation according to the fourth embodiment that uses an SOA and a digital PCU.

The first step (corresponding to box 301 in FIG. 3) is to detect the expected pilot tones carried in the DWDM signals at the input and the output of the Smart OA. Blocks 505, 507 and 509 as shown in FIG. 5, perform the tone detection function at the input and blocks 506, 508 and 510, perform the tone detection function at the output. The optical taps (505 and 506) extract a small fraction of the DWDM signals at the input and output of the traditional EDFA 511. Each of the DWDM signals might be dithered with sinusoidal pilot tones. These tapped optical signals are converted to electrical signals by the PIN diodes (507 and 508) and then amplified by the electrical amplifiers 509 and 510. The second step (corresponding to box 302 in FIG. 3) performed by the analog PCU 518 is to compare the input and output frequency spectrum obtained from the first step. Because of the cross gain modulation in the EDFA, the input and output frequency spectra will differ by the cross-talk amplitudes. However, before comparison, the amplitude and phases of the output signal must be adjusted to offset the amplifier gain and delay introduced by the optical amplifier. This adjustment is performed by the amplitude and phase adjustment unit 515 and the comparison is performed by an analog comparator 516. The output of the analog comparator 516 is the difference between the input and output signals. If there is no cross-talk, then the output should be zero. Any deviation from zero will imply cross-talk. In the case when the EDFA gain is changed, the EDFA main control 521 reports the new gain to the amplitude and phase adjustment unit 515, such that the appropriate adjustments are performed. The third step (corresponding to box 303 in FIG. 3) is to determine which tones are cross-talk tones and whether cancellation is required. This function is performed by the analog comparator 516. If the cross-talk tones are greater than the specified noise floor threshold, then cancellation is required. The analog comparator 516 will generate the sum of all the analog cancellation tones with appropriate amplitudes and phases, such that cross-talk is eradicated with high precision. This operation corresponds to box 304 in FIG. 3. In the fourth step (corresponding to box 305 in FIG. 3) the analog signal generated from step 3 is used to perform cross-talk cancellation. The analog signal is used to modulate the EDFA pump laser 504 via a driver 520 in the XTCU 512 within the Smart OA (EDFA) 500. The pump signal is inserted into the Erbium Doped Fiber Coil (EDFC) 501 via the pump add filter 502. At the output of the EDFC 501, the remaining pump signal is removed by the pump drop filter 503.

The system 599 in the second embodiment (see FIG. 6) uses the optical amplifier 201 implemented as a Smart EDFA 600 and the processing and control unit 208 implemented as an digital PCU 622. The system 599 includes Input Optical Tap 605 and Output Optical Tap 606 for detecting the pilot tones carried in the DWDM signals at the input and output of the Smart OA. In this embodiment, the Smart OA 201 is implemented as a Smart EDFA 600. The smart EDFA 600 comprises an XTCU 624, a traditional EDFA 630, a D/A converter 619 and an EDFA Pump Laser 604 and a Driver 620. The Traditional EDFA 630 comprises a Pump Add Filter 602, a Pump Drop Filter 603, an EDFA main control 621 and an EDFC 601. The tapped input Optical signal is converted to electrical signal by using an O/E Amplifier 626 which comprises a PIN diode 607 and an Amplifier 609. The tapped output signal is converted to electrical signal by using an O/E Amplifier 627 which comprises a PIN diode 608 and an Amplifier 610. The converted output signal is processed by a digital PCU 622. The digital PCU 622 comprises an Amplitude & Phase Adjustment Unit 615, A/D converters 611 and 612, Tone Detectors 613 and 614, a Control unit 617, a Tone Generator 618 and a Comparator 616.

The system 599 uses a digital PCU 622 instead of an analog PCU used in the first embodiment. As a result, the analog signals produced by the optical to electrical conversion and amplification units 626 and 627 are converted into digital signals by the A/D converters 611 and 612 respectively. The tone detectors 613 and 614, convert the time domain signals into frequency domain spectra from which the expected pilot tones are obtained. A digital comparator 616 is used in the digital PCU 622. As in the case of the first embodiment, before comparing the frequency spectra, an amplitude and phase adjustment is performed by an amplitude and phase adjustment unit 615 to offset the amplifier gain and delay introduced by the optical amplifier. The tone generator 618 produces cross-talk cancellation tones with appropriate amplitude and phases such that cross-talk is eradicated. The XTCU 624, within the Smart OA 600, has an additional component, the D/A converter 619, that converts the digital cancellation tones generated by the tone generator 618 in the PCU 622 to an analog signal that drives the pump modulator in the EDFA Pump Laser 604. The rest of the operations performed are similar to the first embodiment described earlier.

The systems 699 and 799 of the third and fourth embodiments (see FIG. 7 and FIG. 8) are similar to the first and second embodiments (see FIG. 5 and FIG. 6) respectively except that a Smart OAs 700 and 800 are used in place of Smart EDFAs 500 and 600. The output of the XTCU within the Smart OA (SOA) is thus used for controlling the electrical pump of the SOA instead of the optical pumps used in the first two embodiments.

Figure 9:
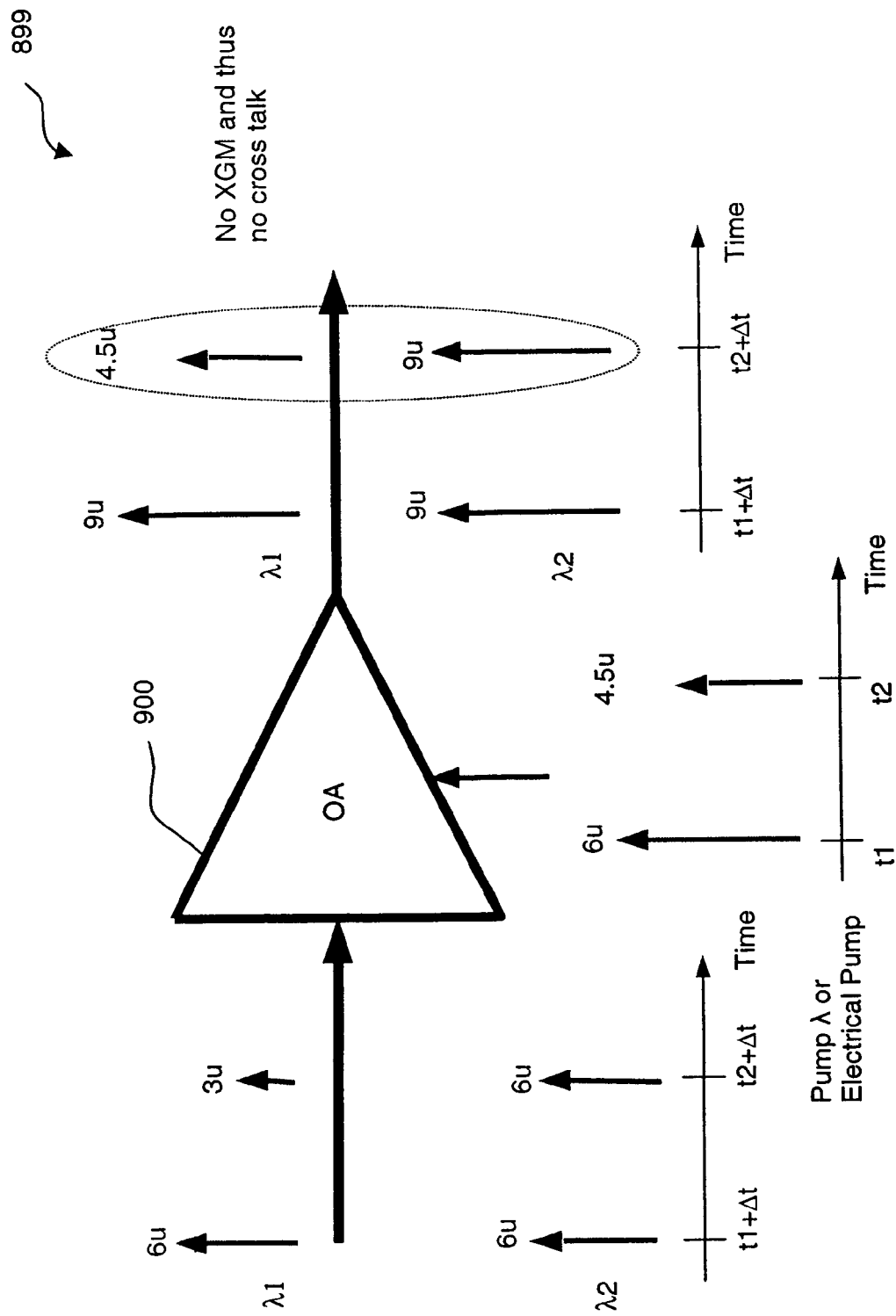
FIG. 9 presents an example for explaining the cross-talk cancellation method.
Figure 10:
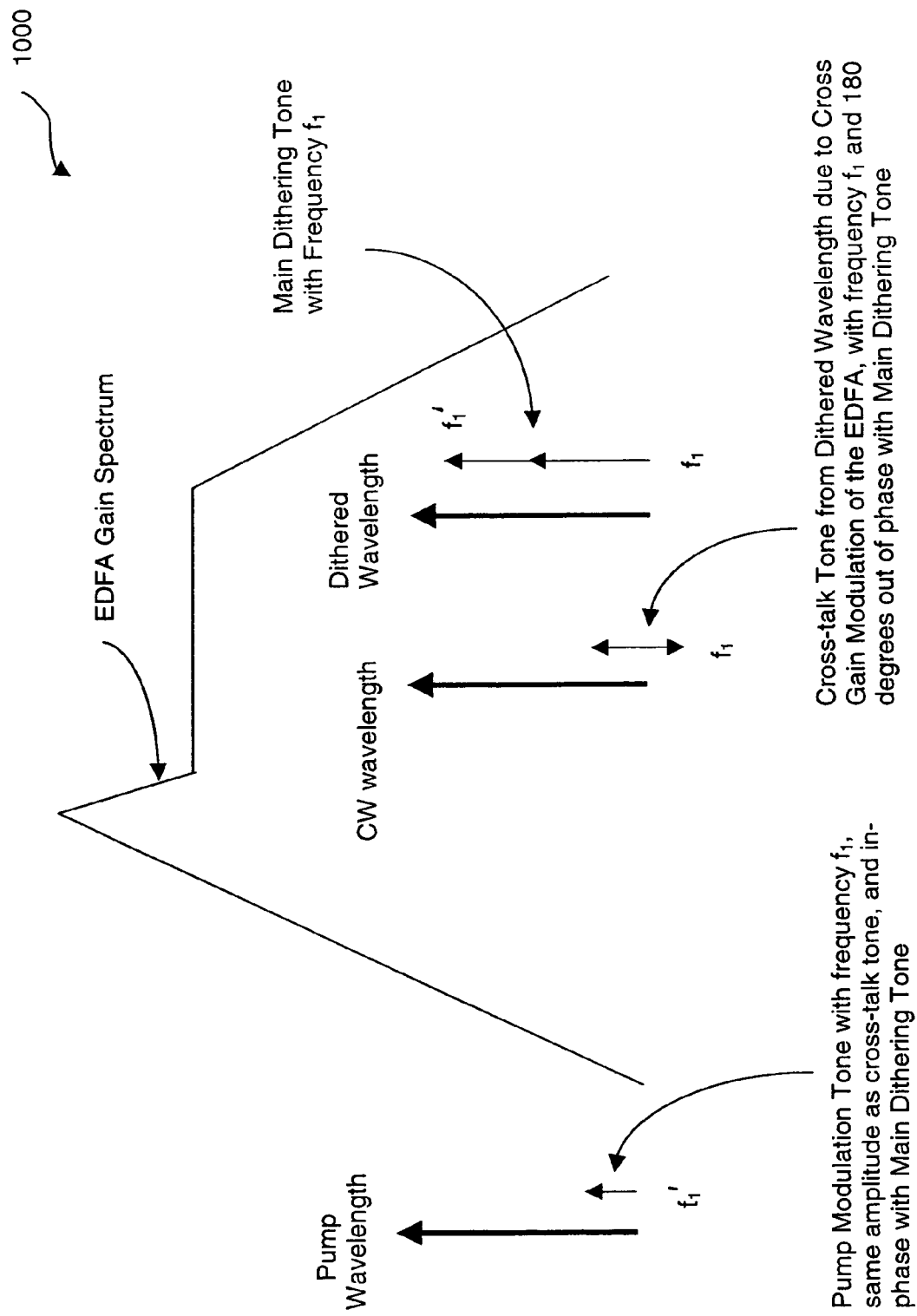
FIG. 10 presents an example to illustrate the cross-talk cancellation achieved with an EDFA-based system.
Figure 11:
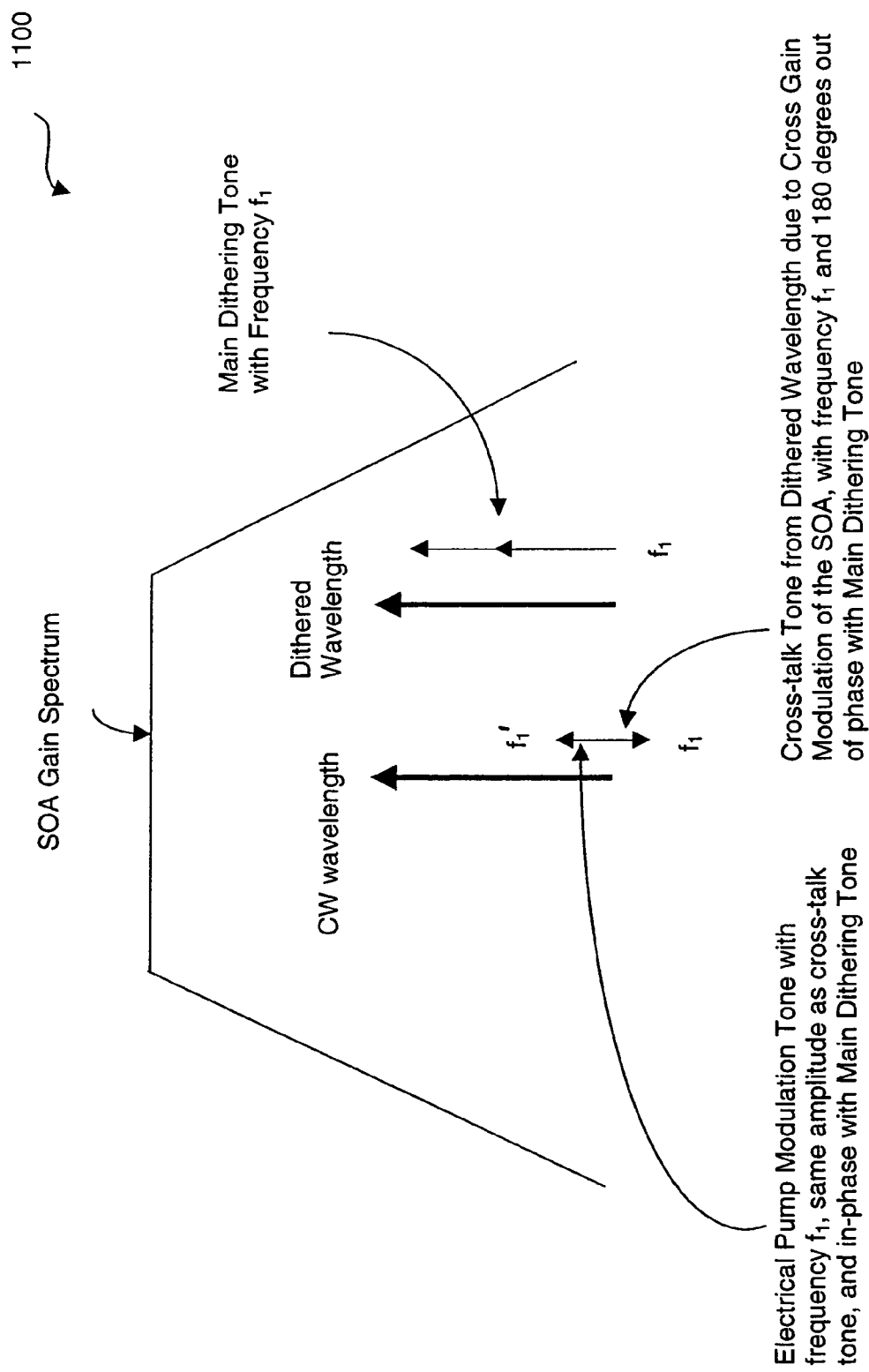
FIG. 11 presents an example to illustrate the cross-talk cancellation achieved with an SOA-based system.

The operation of the systems 499, 599, 699 and 799 in the first four embodiments is based on varying the pump power of the optical amplifier through pump modulation so that the same gain is achieved at all times for varying DWDM optical input powers. For example, when the amplitude of $\lambda_1$ changes from 6 u to 3 u, pump modulation is used to maintain the same gain (see FIG. 9). As a result, amplitudes of 4.5 u and 9 u are obtained at the Smart OA output for $\lambda_1$ and $\lambda_2$ respectively. FIG. 10 and FIG. 11 show two examples illustrating the cancellation of the cross-talk tones. In the case of EDFA (see FIG. 10), there are two wavelengths inside the EDFA gain spectrum. One is a continuous wave (CW wavelength) which has no modulation, and the other one is dithered with a main dithering tone of frequency f1 (Dithered wavelength). Because of cross gain modulation, a cross-talk tone with frequency f1 appears at the CW wavelength. The amplitude of the cross-talk tone is a fraction of the main dithering tone (the main dither frequency is within the bandwidth of sufficient cross-talk and of sufficient amplitude) and has a response of a low pass filter. The phase response of the cross-talk is that of a low pass filter with the phase being approximately 180-degree relative to the main dithering tone within the cut-off frequency of the EDFA. Beyond the cut-off frequency the phase of the dithering tone can be predicted via a low pass filter amplitude and phase response characteristic equation with cut-off frequency of $$f_c = \frac{1+B}{2\pi T}$$

[Freeman et al.], where T is the EDFA spontaneous lifetime, and $$B = \sum_{l=1}^{N} \frac{P_i^{out}}{P_i^{IS}}$$

with $P_i^{out}$ is the channel average output power and $P_i^{IS}$ is the channel intrinsic saturation power. In order to cancel the cross-talk tone, the pump laser is modulated with a tone, which has an appropriate amplitude and phase such that the final phase of the cancellation tone is 180 degrees out of phase with the cross-talk tone with the same magnitude. The appropriate magnitude and phase of the pump inserted cancellation tone can be deduced from a low pass filter amplitude and phase response characteristic equation with the above cut-off frequency $f_c$. A similar methodology can be followed with the Smart OA (EDFA) 1200 in FIG. 12, with the exception that the Smart OA uses direct electrical pump modulation.

Figure 12:
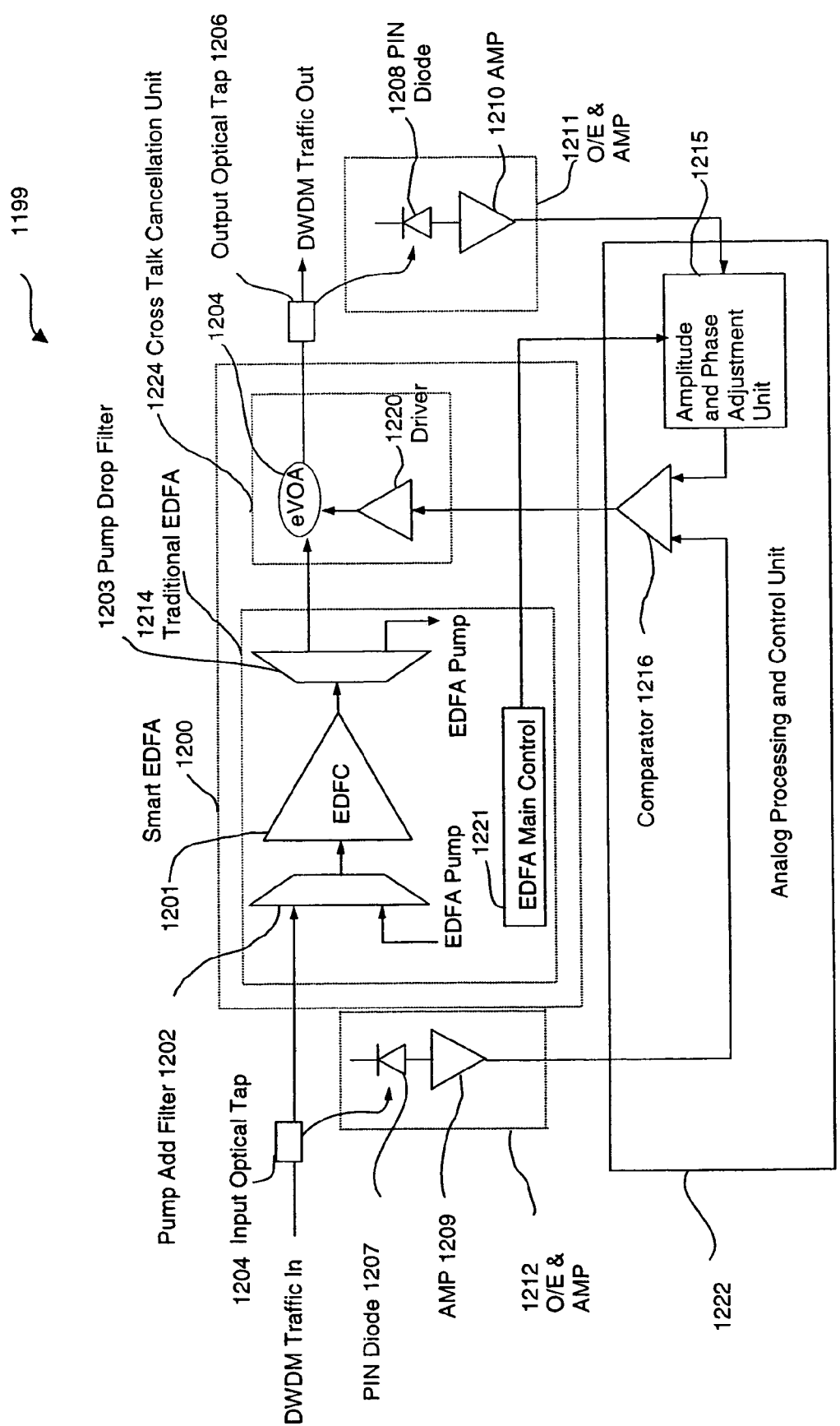
FIG. 12 shows the system for cross-talk cancellation according to the fifth embodiment that uses an EDFA, an eVOA and an analog PCU.
Figure 13:
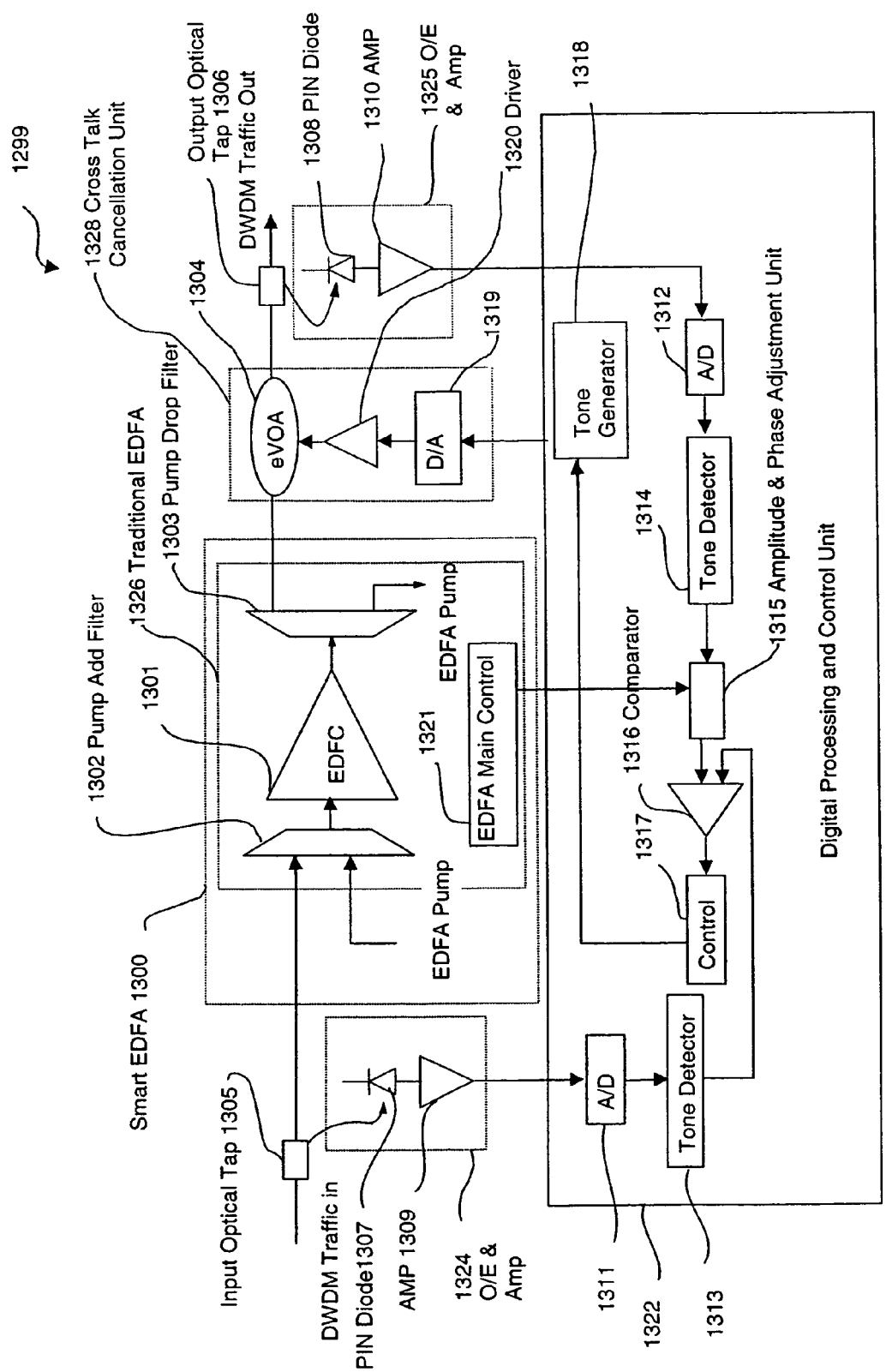
FIG. 13 shows the system for cross-talk cancellation according to the sixth embodiment that uses an EDFA, an eVOA and a digital PCU.
Figure 14:
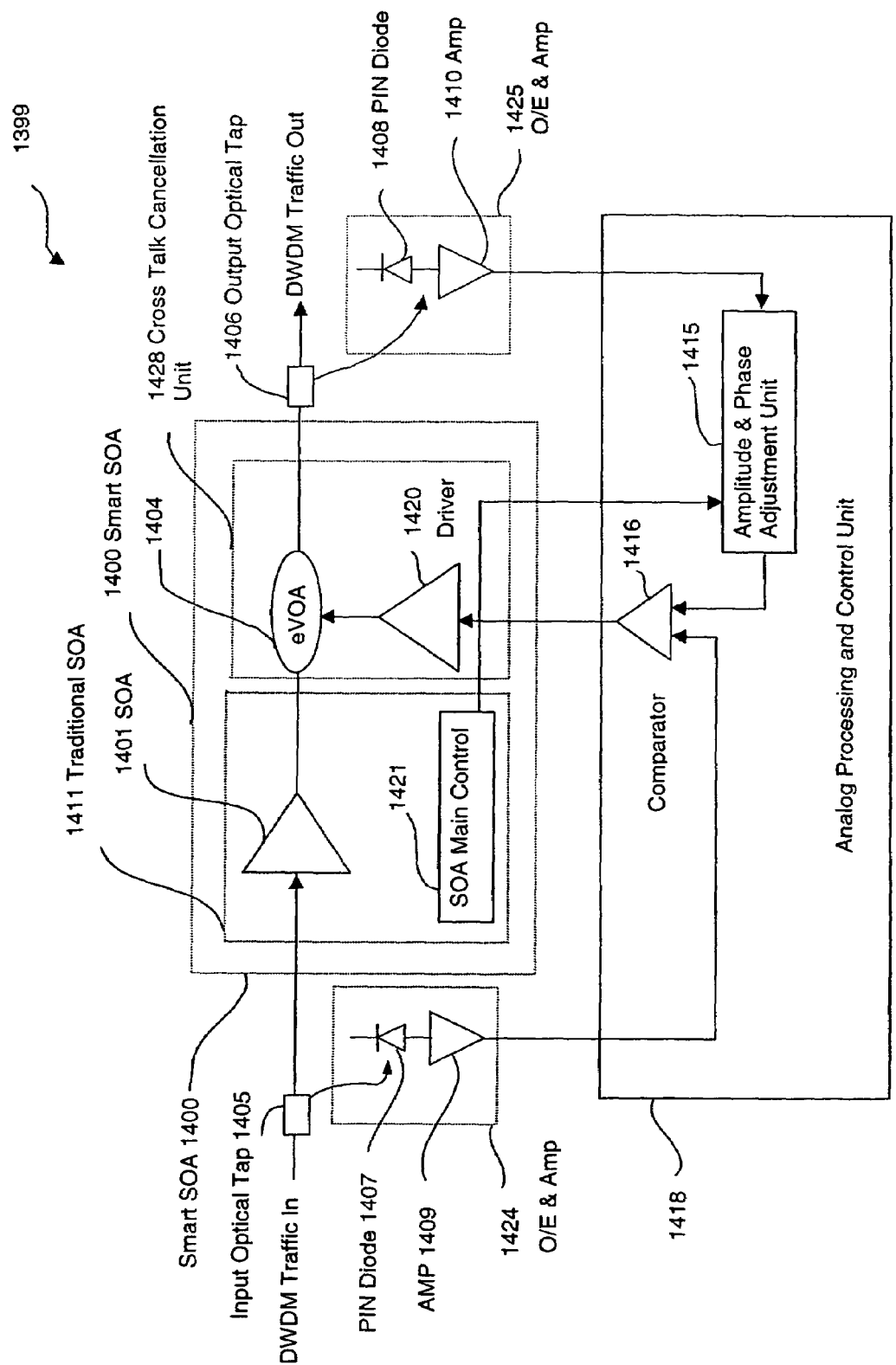
FIG. 14 shows the system for cross-talk cancellation according to the seventh embodiment that uses an SOA, an eVOA and an analog PCU.
Figure 15:
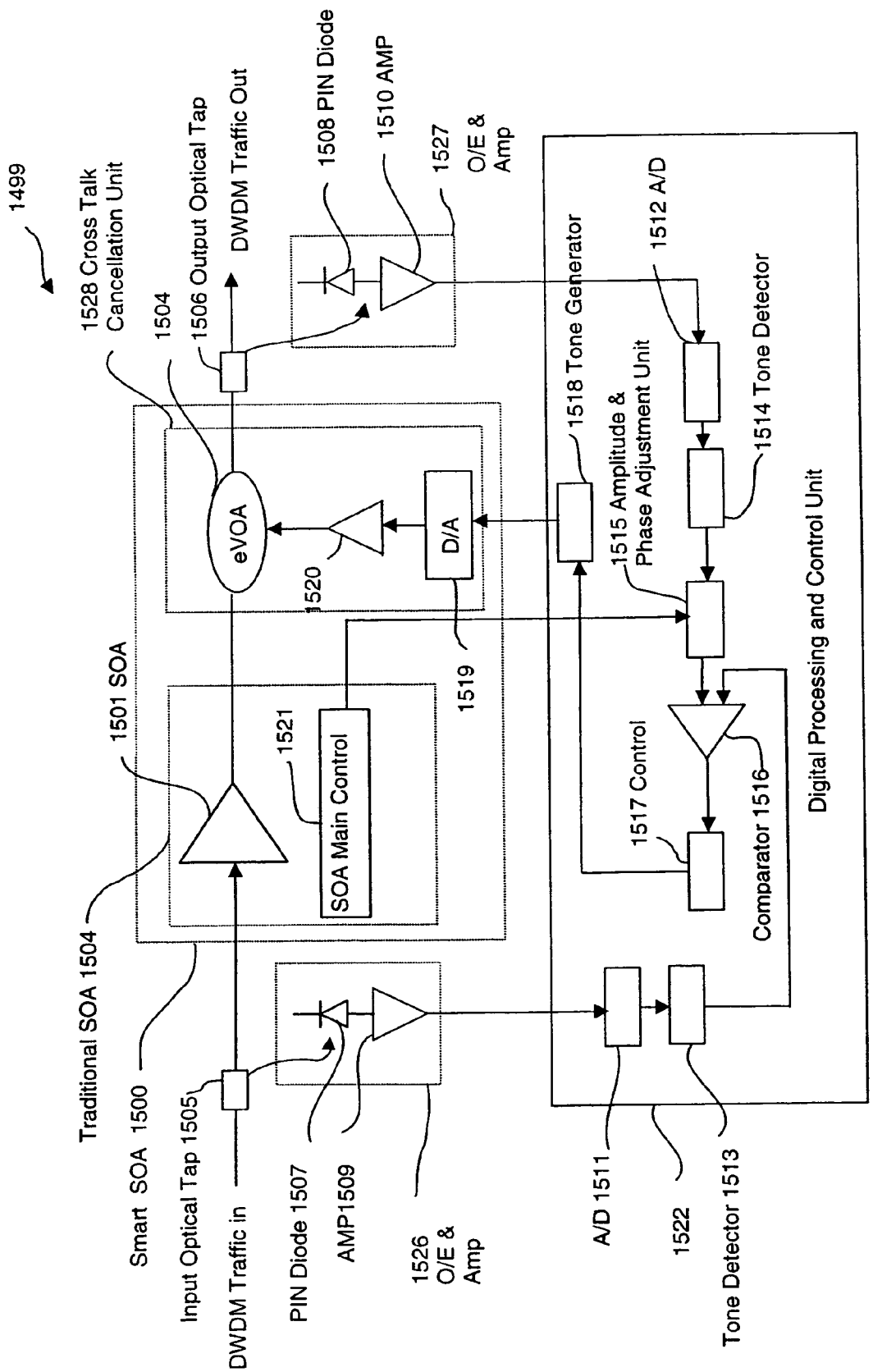
FIG. 15 shows the system for cross-talk cancellation according to the eighth embodiment that uses an SOA, an eVOA and a digital PCU.

The fifth, sixth, seventh and eighth embodiments (1199, 1299, 1399 and 1499) use electrically controlled variable optical attenuators inside the Smart OAs. FIG. 12 and FIG. 13 describe EDFA-based systems that use an analog (box 1222) and a digital PCU (box 1322) respectively. FIG. 14 and FIG. 15 present SOA-based systems that use an analog (box 1418) and a digital PCU (box 1522) respectively. In case of these last four embodiments (1199, 1299, 1399 and 1499) the detection of tones at the input and output are performed in a fashion similar to those used in case of the first four embodiments (499, 599, 699 and 799) described earlier. Optical taps extract a small fraction of the DWDM signals at the input and output of the Smart OA. Each of the DWDM signals might be dithered with sinusoidal pilot tones. These tapped optical signals are converted to electrical signals by PIN diodes and then amplified by the electrical amplifiers, the outputs of which are presented to the PCU. The functions of the digital PCUs, 1322 and 1522, are same as those described earlier for 622 and 822 respectively. The function of analog PCUs, 1222 and 1418 are similar to those of 518 and 718 respectively. An operation performed by the PCU is the comparison of the input and output frequency spectrum obtained. As described earlier, additional operations are required for a digital PCU. For example, the analog signals produced by the optical to electrical conversion and amplification units are converted into digital signals by the A/D converters when a digital PCU is used. Additional tone detectors that convert the time domain signals into frequency domain spectra are also required in the digital PCU. An analog comparator unit is deployed in an analog PCU whereas a digital comparator unit is used in the digital PCU. In case, when the EDFA gain is changed, the EDFA main control (block 1221 in FIG. 12 for example) reports the new gain to the amplitude and phase adjustment unit (block 1215) such that the appropriate amplitude and phase adjustments can be performed. The output of the comparator (block 1216 in FIG. 12 for example), however, is used to control the attenuation applied via an eVOA 1204 in order to cancel the cross-talk generated in the OA. This is a different scheme of cross-talk cancellation compared to the scheme used in the first four embodiments, described in 499, 599, 699 and 799, where the output of the cancellation tone generator is applied to pump modulation in order to cancel cross-talk. As described in the case of the first four embodiments, the output of an analog PCU (499 and 699) is applied directly to control the attenuation applied via an eVOA whereas the output of a digital PCU (599 and 799) is converted from digital to analog by a D/A converter before it is used to control the attenuation applied via the eVOA.

These described methods and systems do not require external CW lasers, as the inherent pump of the EDFA or SOA or an eVOA has been utilized, leading to inexpensive implementations of the cross-talk cancellation techniques.

Numerous modifications and variations of the present invention are possible in light of the above teaching. It is therefore to be understood that within the scope of the appended claims, the invention may be practiced otherwise than as specifically described herein.

We claim:

1. A method for cancellation of cross-talk among multiple channels occurring in a traditional Optical amplifier (OA), the method comprising the steps of:
    detecting tones at an input and an output of a Smart Optical Amplifier (Smart OA), the Smart OA comprising the traditional OA and a Cross-talk Cancellation Unit (XTCU);
    comparing the detected tones at the input and output of the Smart OA;
    generating destructive tones with such amplitudes and phases so as to cancel cross-talk; and
    eradicating cross-talk at the output of the Smart OA by applying the destructive tones in the XTCU,
    wherein the steps of comparing the detected tones and generating the destructive tones comprise the steps of:
    processing the electrical signals corresponding to the input and output of the Smart OA in a Processing and Control Unit (PCU) and a gain information signal from the Smart OA for the PCU; and
    generating cross-talk cancellation tones by the PCU.

2. A method as claimed in claim 1, wherein the step of processing the electrical signals in the PCU comprises the step of processing the electrical signals in an analog PCU including an amplitude and phase adjustment unit and an analog comparator unit.

3. A method as claimed in claim 2, wherein the step of processing the electrical signals in the analog PCU further comprises the steps of:
    performing adjustments of the output signal of the Smart OA using a gain information signal provided by the traditional OA when gain of the traditional OA is changed; and
    comparing frequency domain spectra of the input and the processed output signals of the Smart OA by the analog comparator unit and generating the cross-talk cancellation tones.

4. A method as claimed in claim 3, wherein the step of comparing the frequency domain spectra and generating the cross-talk cancellation tones further comprises the steps of:
    identifying the cross-talk tones and determining if the cross-talk tones are greater than a predetermined noise floor threshold; and
    generating a sum of all the cancellation tones with such amplitudes and phases as an output of the PCU so as to eradicate cross-talk when the cross-talk tones are greater than said noise floor threshold.

5. A method as claimed in claim 2, wherein the step of detecting tones comprises detecting tones at the input and the output of the Smart OA that includes an Erbium Doped Fiber Amplifier (EDFA) and the XTCU.

6. A method as claimed in claim 5, wherein the step of eradicating cross-talk at the output of the Smart OA comprises modulating a pump laser in the EDFA by using the output of the analog PCU.

7. A method as claimed in claim 6, wherein the step of modulating the pump laser in the EDFA further comprises the steps of:
    inserting a pump signal into an Erbium Doped Fiber Coil (EDFC) within the EDFA through a pump add filter of the EDFA; and
    removing a remaining pump signal at the output of the EDFC by a pump drop filter of the EDFA.

8. A method as claimed in claim 2, wherein the step of processing the electrical signals comprises the step of detecting tones at the input and the output of the Smart OA that includes a Semiconductor Optical Amplifier (SOA) and the XTCU.

9. A method as claimed in claim 8, wherein the step of eradicating cross-talk at the output of the Smart OA comprises a step of modulating an electrical pump in the SOA by using the output of the analog PCU.

10. A method as claimed in claim 2, wherein the step of processing the electrical signals in the analog PCU comprises the step of detecting tones at the input and the output of the Smart OA that includes the EDFA and an electrically controlled Variable Optical Attenuator (eVOA)-based XTCU.

11. A method as claimed in claim 10, wherein the step of eradicating cross-talk at the output of the Smart OA comprises the step of controlling attenuation of the eVOA by using the output of the analog PCU.

12. A method as claimed in claim 2, wherein the step of processing the electrical signals comprises the step of detecting tones at the input and the output of the Smart OA that includes the SOA and the eVOA-based XTCU.

13. A method as claimed in claim 12, wherein the step of eradicating cross-talk at the output of the Smart OA comprises the step of controlling attenuation of the eVOA using the output of the analog PCU.

14. A method as claimed in claim 1, wherein the step of processing the electrical signals in the PCU comprises the step of processing electrical signals in a digital PCU, comprising A/D converters, tone detectors, an amplitude and phase adjustment unit, and a digital comparator unit.

15. A method as claimed in claim 14, wherein the step of processing of the electrical signals in the digital PCU further comprises the steps of
    converting said signals from analog to digital by the A/D converters;
    converting the digital signals, which are in time domain into frequency domain spectra by the tone detectors;
    performing adjustments of the converted Smart OA output signal, using a gain information signal provided by the traditional OA when the traditional OA gain is changed; and
    comparing the frequency domain spectra of the input and the processed output signals of the Smart OA by the digital comparator unit and generating cross-talk cancellation tones.

16. A method as claimed in claim 15, wherein the step of comparing the frequency domain spectra and generating the cross-talk cancellation tones further comprises the steps of:
    identifying the cross-talk tones and determining if the cross-talk tones are greater than a predetermined noise floor threshold; and
    generating the cross-talk cancellation tones with such amplitudes and phases as an output of the digital PCU so as to eradicate the cross-talk, when the cross-talk tones are greater than said noise floor threshold.

17. A method as claimed in claim 14, wherein the step of processing the electrical signals comprises the step of detecting the tones at the input and the output of the Smart OA that includes the EDFA and the XTCU.

18. A method as claimed in claim 17, wherein the step of detecting the tones comprises converting the output of the digital PCU from digital to analog by using a D/A converter in the XTCU and modulating the pump laser in the EDFA by using the output from the D/A converter.

19. A method as claimed in claim 18, wherein the step of modulating the pump laser in the EDFA further comprises the steps of:
    inserting a pump signal into the EDFC within the EDFA through a pump add filter of the EDFA; and
    removing the remaining pump signal at the output of the EDFC by a pump drop filter of the EDFA.

20. A method as claimed in claim 14, wherein the step of processing the electrical signals comprises detecting the tones at the output of the Smart OA that includes the SOA and the XTCU.

21. A method as claimed in claim 20, wherein the step of detecting the tones comprises converting the output of the digital PCU from digital to analog by using the D/A converter and modulating an electrical pump in the SOA by using the output of the D/A converter.

22. A method as claimed in claim 14, wherein the step of processing the electrical signals comprises the step of detecting tones at the input and the output of the Smart OA, that includes the EDFA and the eVOA-based XTCU.

23. A method as claimed in claim 22, wherein the step of detecting tones comprises the step of converting output of the digital PCU from digital to analog by using the D/A converter and controlling the attenuation of the eVOA by using the output of the D/A converter.

24. A method as claimed in claim 14, wherein the step of processing the electrical signals comprises detecting tones at the input and the output of the Smart OA including the SOA and the eVOA-based XTCU.

25. A method as claimed in claim 24, wherein the step of detecting tones comprises the step of converting the output of the digital PCU from digital to analog by using the D/A converter and controlling the attenuation of the eVOA by using the output of the D/A converter.

26. A system for cancellation of cross-talk among multiple channels occurring in a traditional Optical Amplifier (OA), the system comprising:
    a Smart Optical Amplifier (Smart OA) having an input and an output and comprising the traditional OA and a Cross-Talk Cancellation Unit (XTCU);
    means for detecting tones at the input and the output of the Smart OA;
    means for comparing the detected tones at the input and the output of the Smart OA and generating destructive tones with such amplitudes and phases so as to cancel the cross-talk; and
    means for eradicating the cross-talk at the output of the Smart OA by applying the destructive tones in the XTCU, wherein the means for comparing the detected tones and generating destructive tones further comprises:
    a Process Control Unit (PCU) comprising means for processing the electrical signals and a gain information signal from the Smart OA; and
    means for generating cross-talk cancellation tones.

27. A system as claimed in claim 26, wherein the PCU is an analog PCU.

28. A system as claimed in claim 27, wherein the analog PCU further comprises:
    an amplitude and phase adjustment unit for performing adjustments of an output signal from the Smart OA using a gain information signal provided by the traditional OA when the gain of the traditional OA is changed; and
    an analog comparator unit for comparing frequency domain spectra of the input and the processed output signals of the Smart OA and generating the cross-talk cancellation tones.

29. A system as claimed in claim 28, wherein the analog comparator unit comprises:
    means for identifying the cross-talk tones and determining of the cross-talk tones are greater than a predetermined noise floor threshold; and
    a tone generator for generating a sum of all the cancellation tones with such amplitude and phases as the output of the PCU so as to eradicate cross-talk, when the cross-talk tones are greater than said noise floor threshold.

30. A system as claimed in claim 27, wherein the Smart OA includes an EDFA and the XTCU.

31. A system as claimed in claim 30, wherein the EDFA includes a pump laser which is modulated by using the output of the analog PCU.

32. A system as claimed in claim 31, wherein the means for modulating further comprises:
    a pump add filter for inserting a pump signal into an Erbium Doped Fiber Coil (EDFC) within the EDFA; and
    a pump drop filter for removing a remaining pump signal at an output of the EDFC.

33. A system as claimed in claim 27, wherein the Smart OA includes an SOA and the XTCU.

34. A system as claimed in claim 33, wherein the SOA includes an electrical pump which is modulated by using the output of the analog PCU.

35. A system as claimed in claim 27, wherein the Smart OA includes the EDFA and an electrically controlled Variable Optical Attenuator (eVOA)-based XTCU.

36. A system as claimed in claim 27, wherein the Smart OA comprises the SOA and the eVOA-based XTCU.

37. A system as claimed in claim 26, wherein the PCU is a digital PCU.

38. A system as claimed in claim 37, wherein the digital PCU further comprises:
    A/D converters for converting said signals from analog to digital;
    tone detectors for converting the digital signals which are in time domain into frequency domain spectra;
    an amplitude and phase adjustment unit for performing adjustments of an output signal from the Smart OA, using the gain information signal provided by the traditional OA when the traditional OA gain is changed; and
    a digital comparator unit for comparing the frequency domain spectra of the input and the processed output signals of the Smart OA and generating the cross-talk cancellation tones.

39. A system as claimed in claim 38, wherein the digital comparator unit comprises:
    means for identifying the cross-talk tones and determining if the cross-talk tones are greater than a predetermined noise floor threshold; and
    means for generating the cancellation tones as the output of the digital PCU with such amplitude and phases so as to eradicate cross-talk, when the cross-talk tones are greater than the said noise floor threshold.

40. A system as claimed in claim 38, wherein the Smart OA includes the EDFA and the XTCU.

41. A system as claimed in claim 40, wherein the EDFA includes a pump laser which is modulated by using the output of a D/A converter used for converting the output of the digital PCU from digital to analog signal.

42. A system as claimed in claim 41, wherein the means for modulating the pump laser in the EDFA further comprises:
   A pump add filter for inserting a pump signal into the EDFC within the EDFA; and
   A pump drop filter for removing the remaining signal at the output of the EDFC.

43. A system as claimed in claim 38, wherein the Smart OA comprises the SOA and the XTCU.

44. A system as claimed in claim 43, wherein the SOA includes an electrical pump which is modulated by using the output of the D/A converter used for converting the output of the digital PCU from digital to analog signal.

45. A system as claimed in claim 38, wherein the Smart OA comprises the EDFA and the eVOA-based XTCU.

46. A system as claimed in claim 40, wherein the Smart OA comprises the SOA and the eVOA-based XTCU.

47. A method as claimed in claim 1, wherein the step of detecting tones at the input and the output of the Smart OA comprises the steps of:
   tapping input and output optical signals at the input and the output of the Smart OA;
   converting tapped optical signals into electrical signals; and
   detecting a pilot tone at the input and output of the Smart OA.

48. A system as claimed in claim 26, wherein the means for detecting tones at the input and the output of the Smart OA comprises:
   optical taps for tapping optical signals at the input and the output of the Smart OA;
   optical to electrical converters for converting the tapped optical signals into electrical signals; and
   means for detecting a pilot tone at the input and the output of the Smart OA.

* * * * *

UNITED STATES PATENT AND TRADEMARK OFFICE
CERTIFICATE OF CORRECTION

| | | |
|---|---|---|
| PATENT NO. | : 7,031,050 B2 | Page 1 of 1 |
| APPLICATION NO. | : 10/607968 | |
| DATED | : June 30, 2008 | |
| INVENTOR(S) | : P. C. Chimfwembe et al. | |

It is certified that error appears in the above-identified patent and that said Letters Patent is hereby corrected as shown below:

The Assignee on the Title page Item (73) is corrected to read --Tropic Networks Inc.,--.

Column 12, line 43, after the phrase "comprises the steps of" insert --:--.

Signed and Sealed this

Fifth Day of August, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,031,050 B2 | Page 1 of 1 |
| APPLICATION NO. | : 10/607968 | |
| DATED | : April 18, 2006 | |
| INVENTOR(S) | : P. C. Chimfwembe et al. | |

It is certified that error appears in the above-identified patent and that said Letters Patent is hereby corrected as shown below:

The Assignee on the Title page Item (73) is corrected to read --Tropic Networks Inc.,--.

Column 12, line 43, after the phrase "comprises the steps of" insert --:--.

This certificate supersedes the Certificate of Correction issued August 5, 2008.

Signed and Sealed this

Twenty-sixth Day of August, 2008

JON W. DUDAS
*Director of the United States Patent and Trademark Office*